(12) United States Patent
Simmons

(10) Patent No.: US 6,378,463 B1
(45) Date of Patent: Apr. 30, 2002

(54) INTERACTIVE PET DEVICE

(76) Inventor: Frances L. Simmons, 1117 N. Homan Ave., Chicago, IL (US) 60651

( * ) Notice: Subject to any disclaimer, the term of this patent is extended or adjusted under 35 U.S.C. 154(b) by 13 days.

(21) Appl. No.: 09/595,473

(22) Filed: Jun. 16, 2000

(51) Int. Cl.⁷ .............................................. A01K 29/00
(52) U.S. Cl. ...................................... 119/707; 119/285
(58) Field of Search ........................... 119/28.5, 702, 119/705, 706, 707, 708

(56) References Cited

U.S. PATENT DOCUMENTS

| | | | | |
|---|---|---|---|---|
| 3,989,008 A | * | 11/1976 | Neumann | 119/28.5 |
| D257,293 S | | 10/1980 | Michalski | D30/160 |
| 4,790,265 A | | 12/1988 | Manson | 119/706 |
| 5,000,116 A | * | 3/1991 | Fife et al. | 118/28.5 |
| 5,072,694 A | * | 12/1991 | Hanyes et al. | 119/28.5 |
| 5,339,770 A | | 8/1994 | Haffner | 119/708 |
| 5,579,725 A | * | 12/1996 | Boshears | 119/707 |
| 5,651,332 A | | 7/1997 | Moore et al. | 119/708 |
| 5,713,306 A | | 2/1998 | Johnson | 119/706 |
| 5,860,389 A | * | 1/1999 | Caldwell | 119/28.5 |
| 5,875,737 A | | 3/1999 | Boshears | 119/706 |
| 5,881,679 A | * | 3/1999 | Hann | 119/707 |

* cited by examiner

Primary Examiner—Charles T. Jordan
Assistant Examiner—Elizabeth Shaw

(57) ABSTRACT

A interactive pet device for providing exercise, entertainment and a resting area for cats. The interactive pet device includes a first plate. The first plate has a top side, a bottom side and a peripheral wall extending therebetween. A second plate has a top surface, a bottom surface and a peripheral wall extending therebetween. A plurality of posts positions the first and second plates in a spaced relationship. Each of the posts has a first end and a second end. Each of the first ends of the plurality of posts is securely coupled to the top surface of the second plate. Each of the second ends is securely coupled to the bottom side of the first plate. A plurality of elongate flexible members each a first and second end. Each of the first ends of the elongate flexible members is securely coupled to the bottom side of the first plate. Each of a plurality of toys is securing coupled to one of the second ends of the elongate flexible members.

17 Claims, 4 Drawing Sheets

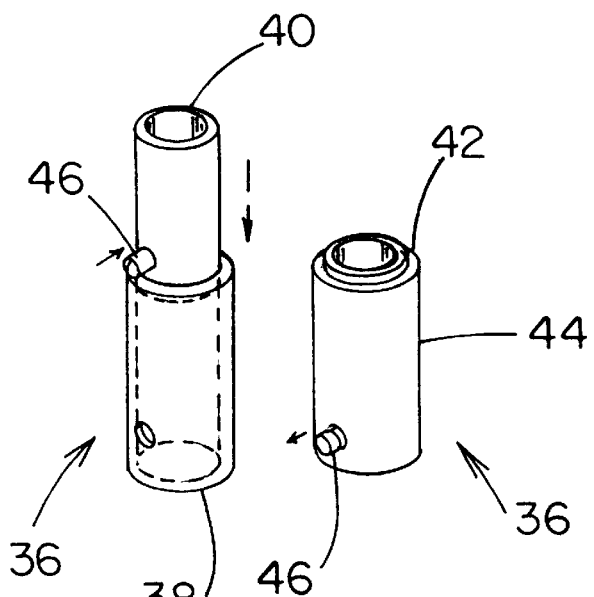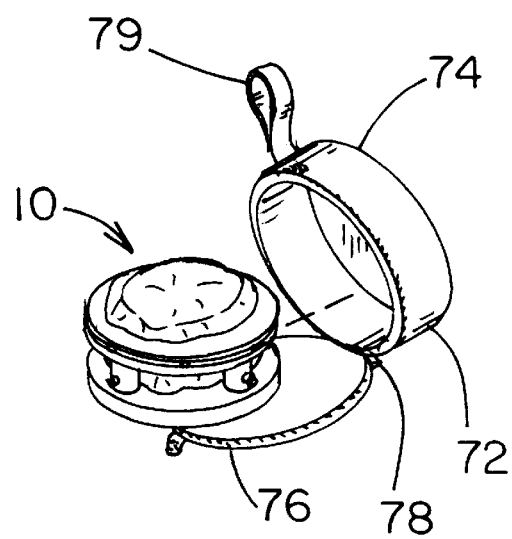

INTERACTIVE PET DEVICE

BACKGROUND OF THE INVENTION

1. Field of the Invention

The present invention relates to pet toys and more particularly pertains to a new interactive pet device for providing exercise, entertainment and a resting area for cats.

2. Description of the Prior Art

The use of pet toys is known in the prior art. More specifically, pet toys heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,790,265; 5,651,332; 5,339,770; 5,875,737; 5,713,306; and Des. 257,293.

While these devices fulfill their respective, particular objectives and requirements, the aforementioned patents do not disclose a new interactive pet device. The inventive device includes a first plate. The first plate has a top side, a bottom side and a peripheral wall extending therebetween. A second plate has a top surface, a bottom surface and a peripheral wall extending therebetween. A plurality of posts positions the first and second plates in a spaced relationship. Each of the posts has a first end and a second end. Each of the first ends of the plurality of posts is securely coupled to the top surface of the second plate. Each of the second ends is securely coupled to the bottom side of the first plate. A plurality of elongate flexible members each a first and second end. Each of the first ends of the elongate flexible members is securely coupled to the bottom side of the first plate. Each of a plurality of toys is securing coupled to one of the second ends of the elongate flexible members.

In these respects, the interactive pet device according to the present invention substantially departs from the conventional concepts and designs of the prior art, and in so doing provides an apparatus primarily developed for the purpose of providing exercise, entertainment and a resting area for cats.

SUMMARY OF THE INVENTION

In view of the foregoing disadvantages inherent in the known types of pet toys now present in the prior art, the present invention provides a new interactive pet device construction wherein the same can be utilized for providing exercise, entertainment and a resting area for cats.

The general purpose of the present invention, which will be described subsequently in greater detail, is to provide a new interactive pet device apparatus and method which has many of the advantages of the pet toys mentioned heretofore and many novel features that result in a new interactive pet device which is not anticipated, rendered obvious, suggested, or even implied by any of the prior art pet toys, either alone or in any combination thereof.

To attain this, the present invention generally comprises a first plate. The first plate has a top side, a bottom side and a peripheral wall extending therebetween. A second plate has a top surface, a bottom surface and a peripheral wall extending therebetween. A plurality of posts positions the first and second plates in a spaced relationship. Each of the posts has a first end and a second end. Each of the first ends of the plurality of posts is securely coupled to the top surface of the second plate. Each of the second ends is securely coupled to the bottom side of the first plate. A plurality of elongate flexible members each a first and second end. Each of the first ends of the elongate flexible members is securely coupled to the bottom side of the first plate. Each of a plurality of toys is securing coupled to one of the second ends of the elongate flexible members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new interactive pet device apparatus and method which has many of the advantages of the pet toys mentioned heretofore and many novel features that result in a new interactive pet device which is not anticipated, rendered obvious, suggested, or even implied by any of the prior art pet toys, either alone or in any combination thereof.

It is another object of the present invention to provide a new interactive pet device, which may be easily and efficiently manufactured and marketed.

It is a further object of the present invention to provide a new interactive pet device, which is of a durable and reliable construction.

An even further object of the present invention is to provide a new interactive pet device which is susceptible of a low cost of manufacture with regard to both materials and labor, and which accordingly is then susceptible of low prices of sale to the consuming public, thereby making such interactive pet device economically available to the buying public.

Still yet another object of the present invention is to provide a new interactive pet device which provides in the apparatuses and methods of the prior art some of the advantages thereof, while simultaneously overcoming some of the disadvantages normally associated therewith.

Still another object of the present invention is to provide a new interactive pet device for providing exercise, entertainment and a resting area for cats.

Yet another object of the present invention is to provide a new interactive pet device which includes a first plate. The first plate has a top side, a bottom side and a peripheral wall extending therebetween. A second plate has a top surface, a bottom surface and a peripheral wall extending therebetween. A plurality of posts positions the first and second plates in a spaced relationship. Each of the posts has a first end and a second end. Each of the first ends of the plurality of posts is securely coupled to the top surface of the second plate. Each of the second ends is securely coupled to the bottom side of the first plate. A plurality of elongate flexible members each a first and second end. Each of the first ends of the elongate flexible members is securely coupled to the bottom side of the first plate. Each of a plurality of toys is securing coupled to one of the second ends of the elongate flexible members.

Still yet another object of the present invention is to provide a new interactive pet device that has telescoping posts such that the posts may be selectively positioned between a collapsed and an extended position.

Even still another object of the present invention is to provide a new interactive pet device that has cushions thereon to act as a sleeping area for a pet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic perspective view of the carrying means of the present invention.

FIG. 8 is a schematic perspective view taken of a post in an extended position of the present invention.

FIG. 9 is a schematic perspective view taken of a post in a retracted position of the present invention.

DESCRIPTION OF THE PREFERRED EMBODIMENT

Figure 1:
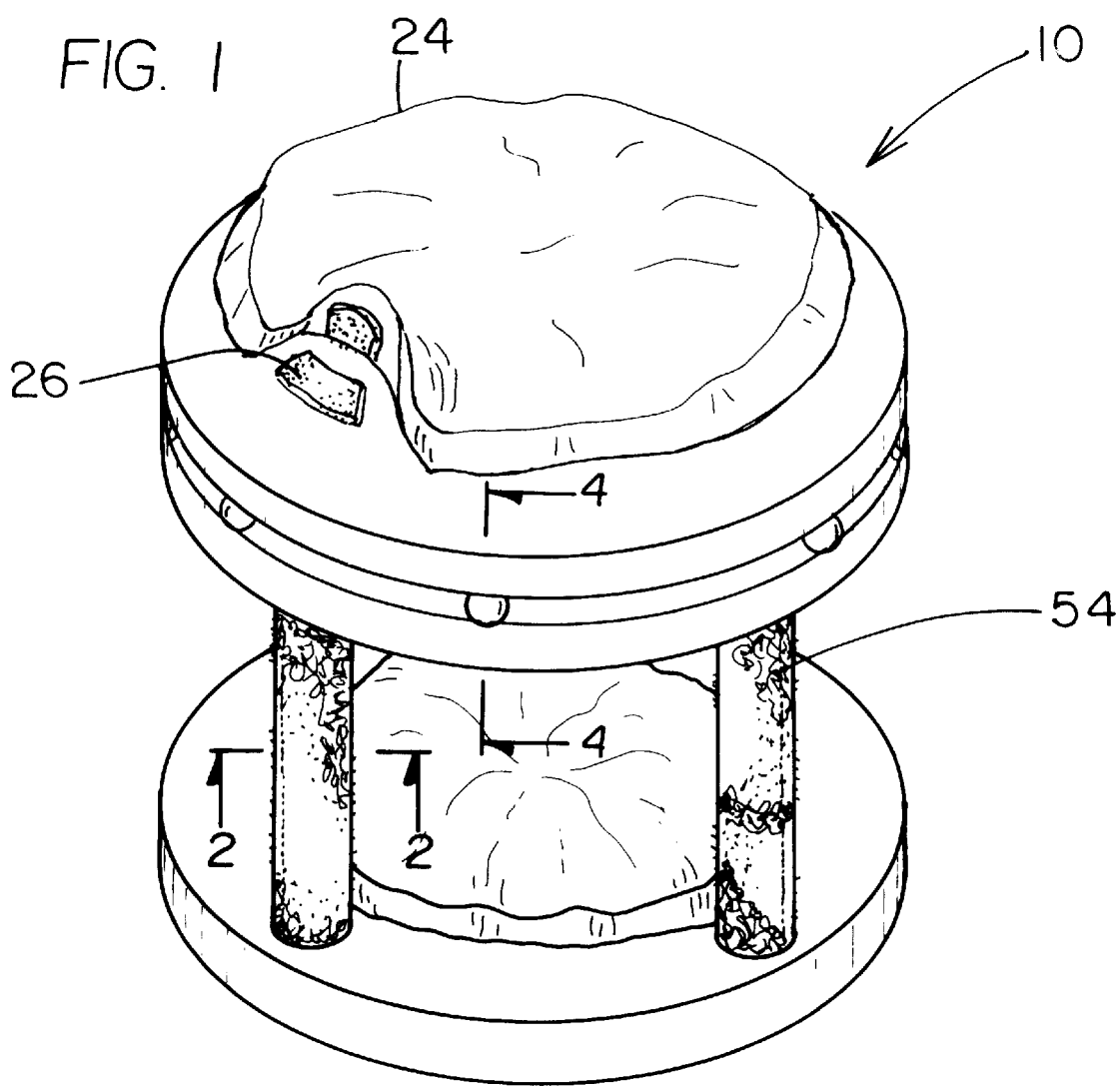
FIG. 1 is a schematic perspective view of a new interactive pet device according to the present invention.
Figure 2:
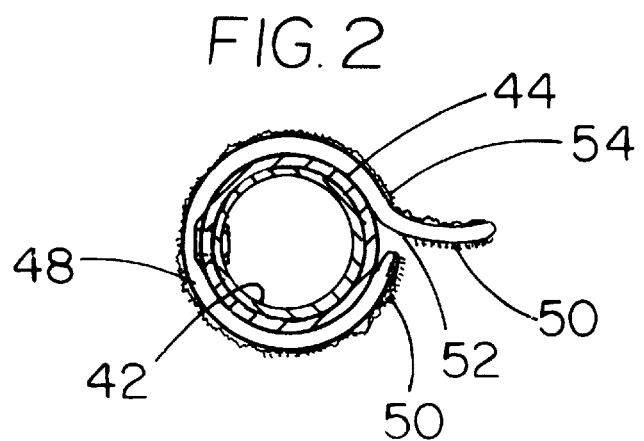
FIG. 2 is a schematic cross-sectional view taken along line 2—2 of a post of the present invention.
Figure 3:
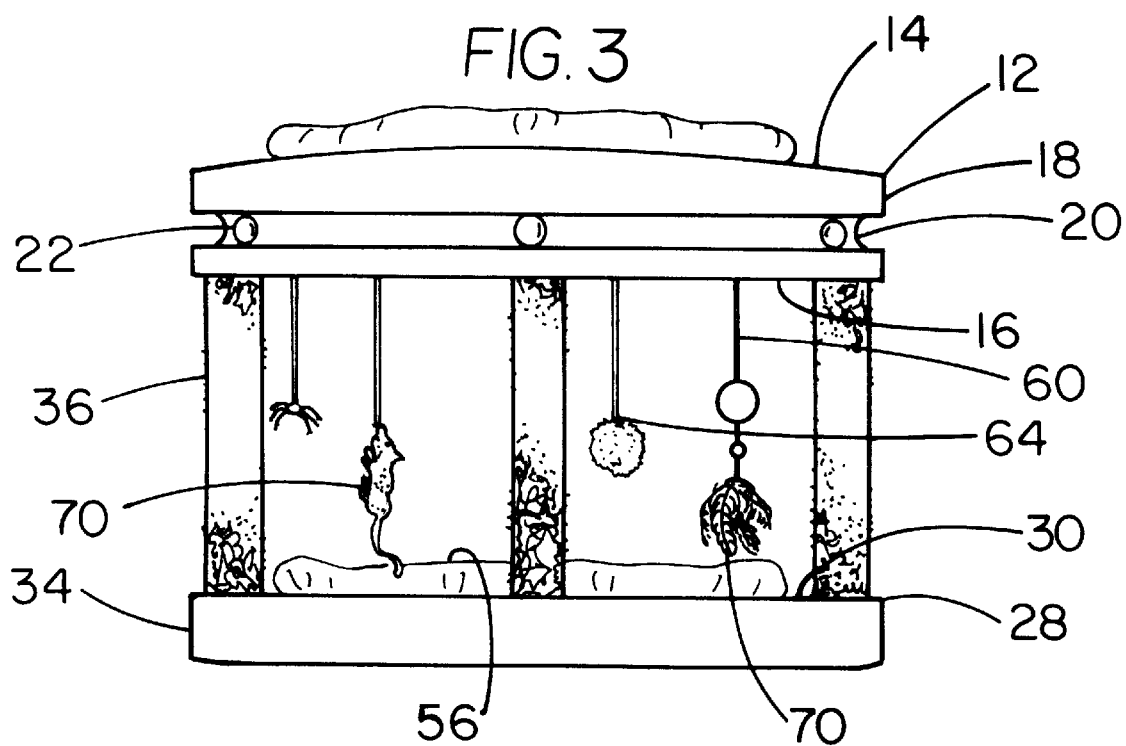
FIG. 3 is a schematic side view of the present invention.
Figure 4:
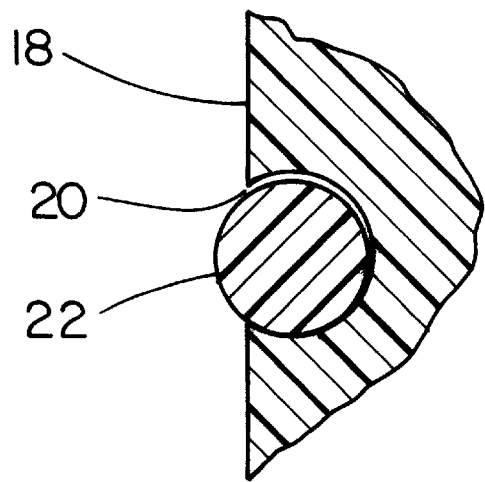
FIG. 4 is a schematic cross-sectional view taken along line 4—4 of the present invention.
Figure 5:
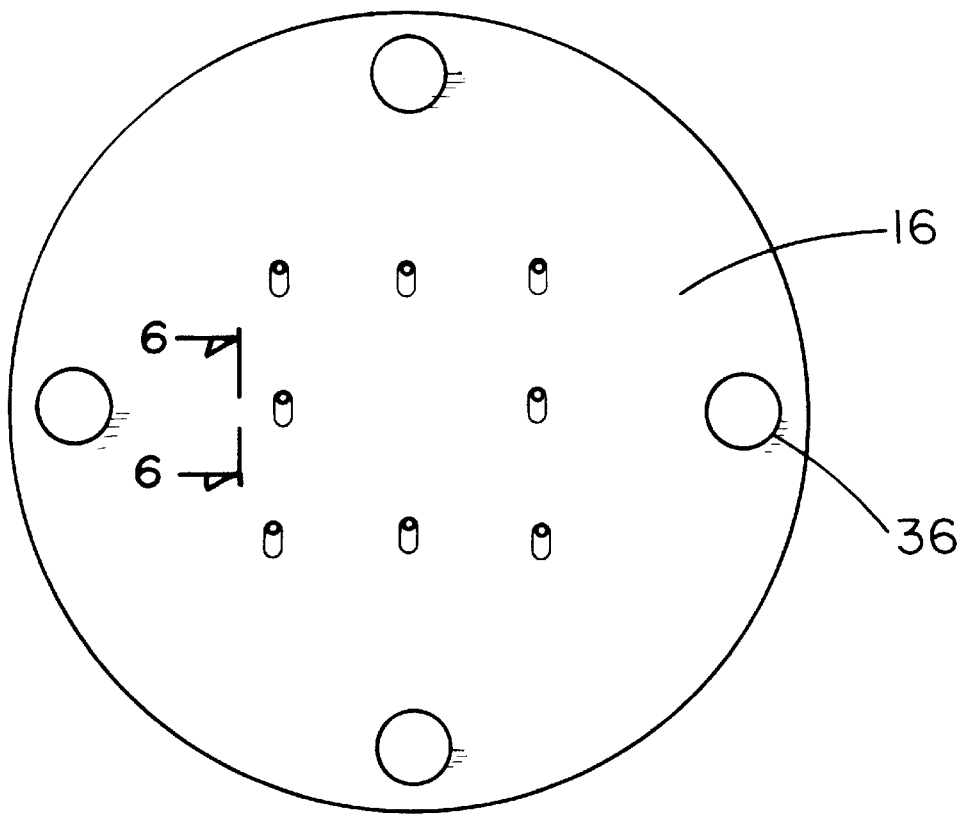
FIG. 5 is a schematic bottom view of the top plate of the present invention.
Figure 6:
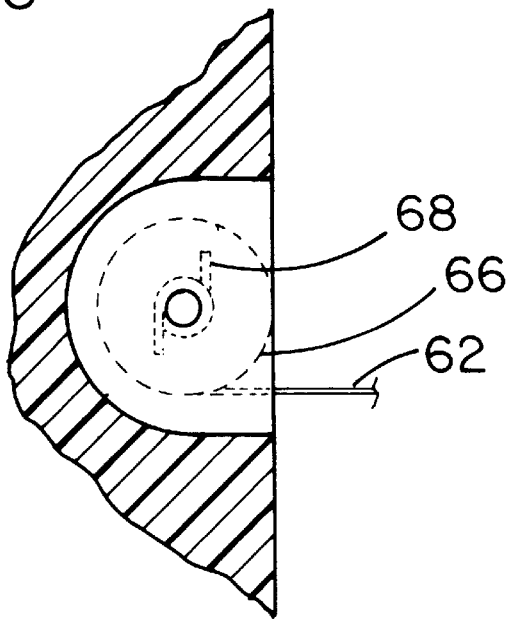
FIG. 6 is a schematic side cross-sectional view taken along line 6—6 of the present invention.

With reference now to the drawings, and in particular to FIGS. 1 through 9 thereof, a new interactive pet device embodying the principles and concepts of the present invention and generally designated by the reference numeral 10 will be described.

As best illustrated in FIGS. 1 through 9, the interactive pet device 10 generally comprises a first plate 12. The first plate 12 has a top side 14, a bottom side 16 and a peripheral wall 18 extending therebetween. The peripheral wall 18 has an annular channel 20 therein. The top 14 and bottom 16 sides have a generally circular shape.

Each of a plurality of balls 22 is rotatably inserted in the annular channel 20 such that the balls 22 may roll about the first plate 12 in the channel 20. Each of the balls 22 preferably comprises a substantially rigid material such as metal or plastic.

A first covering member 24 comprises a cushion. A securing means 26 removably secures the first covering 24 member to the top side 14 of the first plate 12. The securing means 24 preferably comprises a hook and loop securing means, though snaps may also be used.

A second plate 28 has a top surface 30, a bottom surface 32 and a peripheral wall 34 extending therebetween. The top 30 and bottom 32 surfaces have a generally circular shape. A diameter length of the top surface 30 is preferably substantially identical to a diameter length of the bottom side 16 of the first plate 12.

A plurality of posts 36 position the first 12 and second 28 plates in a spaced relationship. Each of the posts 36 has a first end 38 and a second end 40. Each of the first ends 38 of the plurality of posts 36 is securely coupled to the top surface 30 of the second plate 28. Each of the second ends 40 is securely coupled to the bottom side 16 of the first plate 12. The posts 36 are spaced and are preferably positioned generally adjacent to a peripheral edge of the top surface 30. Each of the posts 36 is orientated generally perpendicular to the top surface 30 and the bottom side 16. The posts 36 are ideally telescoping posts such that each post comprises a first portion 42 extendable into a second portion 44. Each of the first portions 42 has a locking means 46 thereon for selectively locking the posts in an extended position. The locking means 46 is button which may be positioned in an extended position to rest upon the edge of the second portion 44 as depicted in FIG. 8. A biasing means, not shown, biases the button in the extended position. The plurality of posts 36 is preferably four posts.

Each of plurality of panels 48 is removably securable to one of the posts 36. Each of the panels 48 has a hook and loop fastening means 50 thereon for removably securing the panels 48 to the posts 36. The panels 48 comprise a generally flexible material having an inner 52 and an outer 54 surface. The outer surface 54 comprises a plurality of looped fibers. The outer surface 54 is a conventional material used for feline scratching posts.

A second covering member 56 also comprises a cushion. A coupling means, not shown, couples the covering member 56 to the top surface 30 of the second plate 28. The coupling means preferably comprises a hook and loop fastening means.

Each of a plurality of elongate flexible members 60 has a first 62 and second 64 end. Each of the first ends 62 of the elongate flexible members being securely coupled to a spool 66 rotatably mounted in the bottom side 16 of the first plate 12. Each of a plurality of biasing means 68 bias a rotation of one of the spools 66 in a first direction. The biasing means 68 preferably comprises a spring. Each of the elongate flexible members 60 comprises a string.

A plurality of toys 70 each is securely coupled to one of the second ends 64 of the elongate flexible members 60 such that each of the toys 70 is suspended over the top surface 30 of the bottom plate 28. The toys 70 are conventional feline toys. Wherein the toy 70 may be pulled down such that the biasing means 68 pulls the toy 70 back toward the first plate 12.

A carrying means 72 for carrying the device comprises a top portion 74 and a base portion 76. The top portion 74 has a lumen therein adapted for receiving the device 10. The top portion 74 has a free edge. A zipper 78 removably couples a free edge of the top portion 74 to a perimeter edge of the base portion 76. A loop 79 is coupled to the top portion 74 and acts as a handle.

In use, the device 10 is placed on a stable surface. The feline sits on the cushions 24, 56 and plays with the toys 70 and the balls 22 that are located in the channel 20. The posts 36 act as scratch posts so that the feline does not scratch other furniture.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An interactive pet device, said device comprising:
    a first plate having a top side, a bottom side and a peripheral wall extending therebetween, said peripheral wall of said first plate having an annular channel therein;
    a plurality of balls, each of said balls being rotatably inserted in said annular channel such that said balls may roll about said first plate in said channel;
    a second plate having a top surface, a bottom surface and a peripheral wall extending therebetween;
    a plurality of posts for positioning said first and second plates in a spaced relationship, each of said posts having a first end and a second end, each of said first ends of said plurality of posts being securely coupled to said top surface of said second plate, each of said second ends being securely coupled to said bottom side of said first plate;
    a plurality of elongate flexible members, each of said elongate flexible members having a first and second end, each of said first ends of said elongate flexible members being securely coupled to said bottom side of said first plate; and
    a plurality of toys, each of said toys being securing coupled to one of the second ends of said elongate flexible members.

2. The interactive pet device as in claim 1, further comprising:
    a covering member; and
    a securing means for removably securing said first covering member to said top side of said first plate.

3. The interactive pet device as in claim 2, further comprising:
    a second covering member; and
    a coupling means for coupling said second covering member to said top surface of said second plate.

4. The interactive pet device as in claim 1, wherein each of said posts is orientated generally perpendicular to said top surface and said bottom side, each of said posts being telescoping posts such that each post comprises a first portion extendable into a second portion, each of said first portions having a locking means thereon for selectively locking said posts in an extended position.

5. The interactive pet device as in claim 4, further comprising a plurality of panels, each of said panels being removably securable to one of said posts, each of said panels comprising a generally flexible material.

6. The interactive pet device as in claim 5, wherein each of said first ends of said elongate flexible members is securely coupled to a spool rotatably mounted in said bottom side of said first plate, each of a plurality of biasing means bias a rotation of one of said spools in a first direction, said biasing means comprising a spring, each of said elongate flexible members comprising a string.

7. The interactive pet device as in claim 1, further comprising a plurality of panels, each of said panels being removably securable to one of said posts, each of said panels comprising a generally flexible material.

8. The interactive pet device as in claim 1, wherein each of said first ends of said elongate flexible members is securely coupled to a spool rotatably mounted in said bottom side of said first plate, each of a plurality of biasing means bias a rotation of one of said spools in a first direction, said biasing means comprising a spring, each of said elongate flexible members comprising a string.

9. An interactive pet device, said device comprising:
    a first plate having a top side, a bottom side and a peripheral wall extending therebetween;
    a second plate having a top surface, a bottom surface and a peripheral wall extending therebetween;
    a plurality of posts for positioning said first and second plates in a spaced relationship, each of said posts having a first end and a second end, each of said first ends of said plurality of posts being securely coupled to said top surface of said second plate, each of said second ends being securely coupled to said bottom side of said first plate;
    a plurality of panels, each of said panels being removably securable to one of said posts, each of said panels comprising a generally flexible material;
    a plurality of elongate flexible members, each of said elongate flexible members having a first and second end, each of said first ends of said elongate flexible members being securely coupled to said bottom side of said first plate; and
    a plurality of toys, each of said toys being securing coupled to one of the second ends of said elongate flexible members.

10. The interactive pet device as in claim 9, wherein said peripheral wall of said first plate has an annular channel therein, further including a plurality of balls, each of said balls being rotatably inserted in said annular channel such that said balls may roll about said first plate in said channel.

11. The interactive pet device as in claim 10, wherein each of said first ends of said elongate flexible members is securely coupled to a spool rotatably mounted in said bottom side of said first plate, each of a plurality of biasing means bias a rotation of one of said spools in a first direction, said biasing means comprising a spring, each of said elongate flexible members comprising a string.

12. The interactive pet device as in claim 9, further comprising a covering member, a securing means removably secures said first covering member to said top side of said first plate.

13. The interactive pet device as in claim 12, further comprising a second covering member and a coupling means for coupling said covering member to said top surface of said second plate.

14. The interactive pet device as in claim 9, wherein each of said posts is orientated generally perpendicular to said top surface and said bottom side, each of said posts being telescoping posts such that each post comprises a first portion extendable into a second portion, each of said first portions having a locking means thereon for selectively locking said posts in an extended position.

15. The interactive pet device as in claim 9, wherein each of said first ends of said elongate flexible members is securely coupled to a spool rotatably mounted in said bottom side of said first plate, each of a plurality of biasing means bias a rotation of one of said spools in a first direction, said biasing means comprising a spring, each of said elongate flexible members comprising a string.

16. An interactive pet device, said device comprising:
   a first plate, said first plate having a top side, a bottom side and a peripheral wall extending therebetween;
   a second plate, said second plate having a top surface, a bottom surface and a peripheral wall extending therebetween;
   a plurality of posts for positioning said first and second plates in a spaced relationship, each of said posts having a first end and a second end, each of said first ends of said plurality of posts being securely coupled to said top surface of said second plate, each of said second ends being securely coupled to said bottom side of said first plate, each of said posts being orientated generally perpendicular to said top surface and said bottom side, each of said posts being telescoping posts such that each post comprises a first portion extendable into a second portion, each of said first portions having a locking means thereon for selectively locking said posts in an extended position;
   a plurality of elongate flexible members, each of said elongate flexible members having a first and second end, each of said first ends of said elongate flexible members being securely coupled to said bottom side of said first plate; and
   a plurality of toys, each of said toys being securing coupled to one of the second ends of said elongate flexible members.

17. The interactive pet device as in claim 16, further including:
   said peripheral wall having an annular channel therein, said top and bottom sides having a generally circular shape;
   a plurality of balls, each of said balls being rotatably inserted in said annular channel such that said balls may roll about said first plate in said channel, each of said balls comprising a substantially rigid material;
   a first covering member comprising a cushion;
   a securing means for removably securing said first covering member to said top side of said first plate, said securing means comprising a hook and loop securing means;
   a diameter length of said top surface being substantially identical to a diameter length of said bottom side of said first plate;
   said plurality of posts being four posts;
   a plurality of panels, each of said panels being removably securable to one of said posts, each of said panels having a hook and loop fastening means thereon for removably securing said panels to said posts, each of said panels comprising a generally flexible material having an inner and an outer surface, said outer surface comprising a plurality of looped fibers;
   a second covering member comprising a cushion;
   a coupling means for coupling said second covering member to said top surface of said second plate, said coupling means comprising a hook and loop fastening means; and
   a carrying means for carrying said device, said carrying means comprising a top portion and a base portion, said top portion having a lumen therein adapted for receiving said device, said top portion having a free edge, a zipper removably coupling a free edge of said top portion to a perimeter edge of said base portion.

* * * * *